(12) United States Patent
Rottenberger et al.

(10) Patent No.: US 6,588,555 B2
(45) Date of Patent: Jul. 8, 2003

(54) PISTON-CYLINDER UNIT WITH AT LEAST ONE BYPASS GROOVE IN THE CYLINDER

(75) Inventors: Theo Rottenberger, Burkardroth-Gefäll (DE); Markus Reinhart, Schweinfurt (DE); Alexander Schwarz, Thüngen (DE); Steffen Gail, Schwebheim (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/938,720

(22) Filed: Aug. 24, 2001

(65) Prior Publication Data

US 2002/0023536 A1 Feb. 28, 2002

(30) Foreign Application Priority Data

Aug. 26, 2000 (DE) .......................................... 100 42 030

(51) Int. Cl.$^7$ ................ F16F 9/48; F16F 9/00
(52) U.S. Cl. ............. 188/285; 188/284; 188/286; 188/322.19
(58) Field of Search ................. 188/284, 285, 188/286, 288, 297, 316, 319.2, 322.19, 322.18, 322.16, 322.17, 322.2

(56) References Cited

U.S. PATENT DOCUMENTS

| 1,373,315 A | | 3/1921 | Dunn .................... 188/287 |
| 2,628,692 A | | 2/1953 | Hufferd .................. 137/99 |
| 3,510,117 A | | 5/1970 | Scholin et al. ............ 267/126 |
| 3,693,767 A | * | 9/1972 | Johnson .................. 188/285 |
| 3,750,856 A | * | 8/1973 | Kenworthy ............... 188/287 |
| 3,998,302 A | * | 12/1976 | Schupner ................ 188/285 |
| 4,057,129 A | * | 11/1977 | Hennells ................. 188/285 |
| 4,153,145 A | * | 5/1979 | Ellis et al. ............. 137/625.37 |
| 4,174,098 A | * | 11/1979 | Baker et al. .............. 188/285 |
| 4,298,101 A | * | 11/1981 | Dressell, Jr. et al. ....... 188/285 |
| 4,482,035 A | * | 11/1984 | Heideman et al. .......... 138/42 |
| 5,228,640 A | * | 7/1993 | Mouille .................. 188/283 |
| 5,682,967 A | * | 11/1997 | Wiard .................... 188/289 |
| 5,788,030 A | * | 8/1998 | Rottenberger ............. 188/299 |
| 5,887,857 A | * | 3/1999 | Perrin ................... 188/322.19 |

FOREIGN PATENT DOCUMENTS

DE      2 105 422      8/1972

OTHER PUBLICATIONS

"Kraftfahrzeugstoβdämpfer", die Bibliothek der Technik, Band 185, S. 38 bis 41.

* cited by examiner

Primary Examiner—Matthew C. Graham
Assistant Examiner—Melody M. Burch
(74) Attorney, Agent, or Firm—Cohen, Pontani, Lieberman & Pavane

(57) ABSTRACT

A piston-cylinder unit including a cylinder in which a piston is guided so as to be displaceable axially, wherein the piston separates the cylinder into two work spaces which communicate via at least one bypass groove in the cylinder depending on the stroke position of the piston, wherein the cylinder is formed of multiple parts and a portion of the cylinder with the at least one bypass groove is displaceable axially relative to at least one further portion of the cylinder.

17 Claims, 2 Drawing Sheets

PISTON-CYLINDER UNIT WITH AT LEAST ONE BYPASS GROOVE IN THE CYLINDER

BACKGROUND OF THE INVENTION

1. Field of the Invention

The invention is directed to a piston-cylinder unit of the type wherein the piston separates the cylinder into two work chambers which communicate via a bypass groove in the cylinder depending on piston stroke position.

2. Description of the Related Art

"Motor Vehicle Shock Absorber [Kraftfahrzeugstoβd ämper]", Bibliothek der Technik, Vol. 185, Verlag Moderne Industrie, pages 38 to 41, discloses a piston-cylinder unit which has a stroke-dependent damping based on at least one bypass groove in the cylinder. This proven method of stroke-dependent damping has the disadvantage that vehicles with different empty weights, e.g., because of differences in their outfitting, cannot make use of a part of the bypass groove and, therefore, cannot make use of a region of the comfortable stroke position of the shock absorber. It is endeavored, when the vehicle is stationary, to move the piston out as centrally as possible within the bypass groove. In vehicles with leveling control, this task is taken on by a supply system which raises or lowers the vehicle body in relation to the vehicle axis. A leveling control cannot be used for many vehicles and applications, for example, because of excessive technical expenditure.

SUMMARY OF THE INVENTION

It is the object of the present invention to provide a piston-cylinder unit with at least one bypass groove between the work spaces in which the problem known from the prior art is overcome.

According to the invention, this object is met in that the cylinder is formed of multiple parts and a portion of the cylinder with the at least one bypass groove is displaceable axially relative to at least one further portion of the cylinder.

With this very simple method, the bypass groove can be displaced within limits independent from a normal position of the piston without great expenditure. Accordingly, in a vibration damper in a vehicle, the bypass groove can be adapted to the normal position of the vehicle when the vehicle is stationary.

However, application is not restricted only to vibration dampers. Bypass grooves are often used in air springs, e.g., as employed in vehicle flaps, and correspond to an opening angle of the vehicle flaps. When the bypass groove is displaced, the opening angle also changes.

In a further construction, the cylinder has a first portion which is guided coaxially inside a second portion.

The second portion of the cylinder advantageously has a base and the first portion carries a piston rod guide for a piston rod.

In order to ensure a continuous adjustment of the position of the bypass groove, the two portions of the cylinder are connected with one another via a thread.

The two portions of the cylinder are clamped via a retaining screw for operating reliability.

According to a feature of the invention, the first portion and the second portion of the cylinder overlap or cover one another, at least one seal being arranged in this area.

Further, the second portion of the cylinder has an adjusting length area having a fastening thread for the retaining screw.

In an application of a vibration damper indicated by way of example, it is possible that an axially movable dividing or separating piston which separates a work space from a compensation space is arranged inside the second portion of the cylinder. Accordingly, there is a larger cross-sectional surface available for the separating piston, so that a gas pressure in the compensation space can be comparatively small.

In another construction, the portions of the cylinder which are displaceable relative to one another have at least one axial projection and a recess or cutout in the direction of the longitudinal axis of the piston-cylinder unit which engage one inside the other, the length of the at least one bypass groove being changeable with the position of the projection within the cutout.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
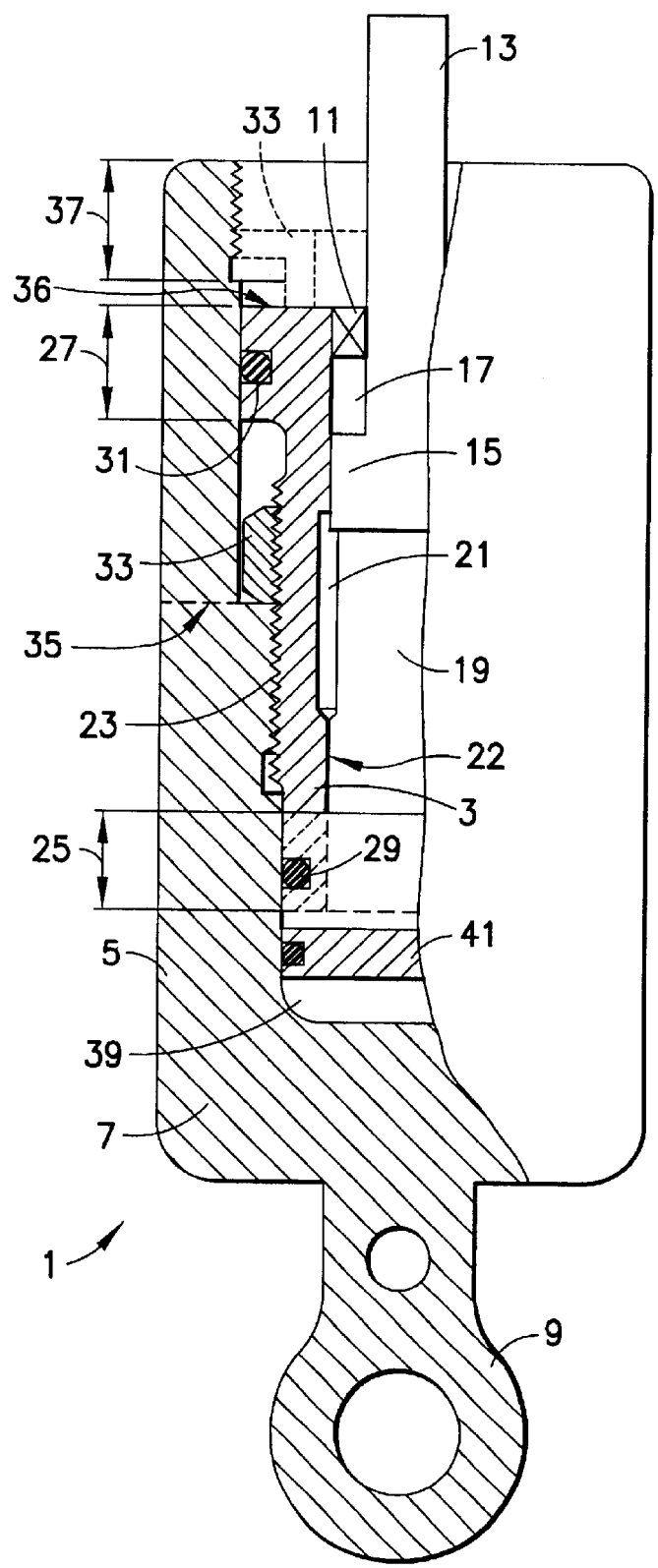
FIG. 1 shows a sectional view of the piston-cylinder unit.

FIG. 1 shows a piston-cylinder unit 1 with a cylinder which has a first portion 3 and a second portion 5. The second portion has a base 7 at which a cylinder-side connection member 9 is arranged. The first portion 3 carries a piston rod guide 11 for an axially movable piston rod 13 which is connected in turn with a piston 15. The piston divides the entire cylinder into two work spaces or chambers 17; 19 which are filled with a work medium, these two work spaces being connected with one another, depending on piston position, by at least one bypass groove 21 which is formed inside the first portion 3. The inner wall of the first portion forms a running surface 22 for the piston 15. An oil or, in the case of an air spring, a gas under pressure, can be used as work medium, for example.

The first portion 3 is arranged coaxially inside the second portion 5 and is guided in axially displaceable manner. A thread 23 is incorporated between the two portions. In addition, both portions have at least one axial overlap 25, 27 which receives at least one seal 29; 31 for sealing the work spaces 17; 19.

In addition, a retaining screw 33 either engages in the thread 23 and is arranged on an end face 35 of the second portion 5 or, alternatively, is arranged in an adjusting length region 37 of the second portion and is supported on an end face 36 of the first portion 3. The adjusting length region has a fastening thread, wherein the thread length is adapted to the maximum axial adjustment between the two portions of the cylinder. In the latter variant, the overlap 27 is preferably formed in the region of the piston rod guide 11, so that a shear force load on the first portion 3 of the cylinder can be favorably absorbed by the second portion 5.

Particularly in vibration damper applications, a compensation space 39 can be formed inside the second portion 5 of the cylinder for the volume of the piston rod 13 which moves in and out, this compensation space 39 being separated from the work space by a separating piston 41. The inner cross section of the second portion is larger than the cross section in the area of the running surface 22 for the piston. Consequently, when the compensation space is filled with a gas, a gas pressure can be used which is comparatively low in comparison with a given supporting force of the separating piston.

During operation of the piston-cylinder unit, the piston position inside the cylinder is checked when the piston is stationary, for example, on the basis of the piston rod length outside the cylinder. If it is determined that the piston 15 is not in the desired position relative to the bypass groove 21, the first portion 3 is rotated relative to the second portion 5, so that, as a result of the thread 23, an axial relative movement of the two portions 3; 5 takes place. In this way, the position of the bypass groove 21 is also compulsorily displaced relative to the piston. When the desired position of the bypass groove 21 relative to the piston 15 is reached, the two portions 3; 5 are fixed by the retaining screw 33.

Figure 2:
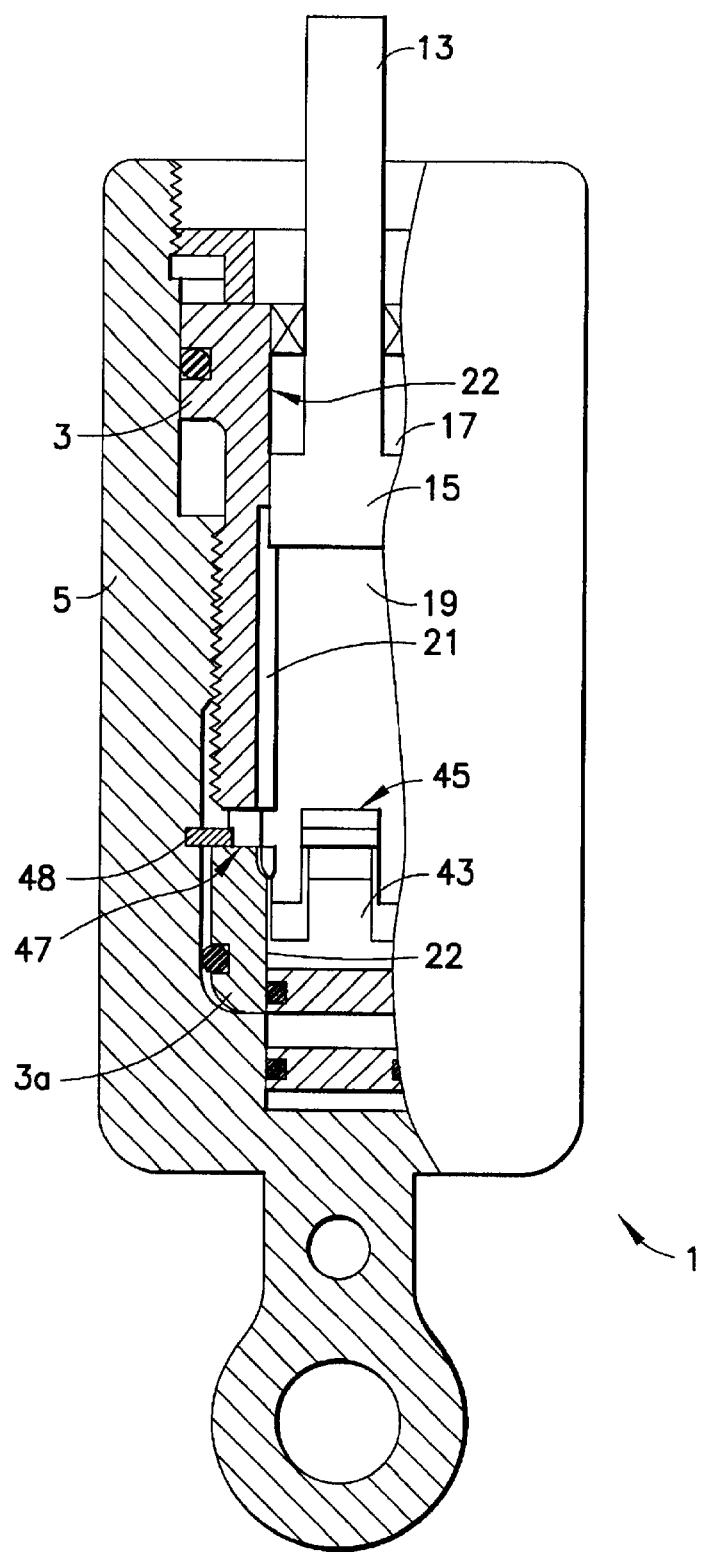
FIG. 2 shows a piston-cylinder unit with adjustable length of the bypass groove.

FIG. 2 shows a modification of the construction according to FIG. 1 in which the essential principle is retained. In contrast to FIG. 1, the running surface 22 for the piston 15 extends on the portion 3 of the cylinder and an insert 3a in portion 5. The insert 3a has at least one axial projection 43 which engages in a cutout 45 of the first portion 3, wherein the projection and the cutout form part of the running surface for the piston. The portion 3 and insert 3a are connected in a positive engagement in the circumferential direction by the shape of the at least one projection and the at least one cutout. The bypass groove 21 which is open at one end in the first portion 3 extends at least to a shoulder 47 of the second portion. The second portion is secured axially by a stop 48, for example, a retaining ring.

During an adjusting movement of the second portion 5 relative to the first portion 3, the projection 43 is displaced relative to the cutout 45, so that a running surface is maintained for the piston 15. Due to the positive engagement of the at least one projection inside the at least one cutout, the insert 3a rotates relative to the second portion 5, but there is no axial relative movement between the insert and the second portion 5 because the stop prevents the insert 3a from being carried along by the first portion 3 of the cylinder. The insert 3a accordingly follows the change in distance between the two portions 3; 5 of the cylinder.

The change in distance between the bypass groove 21, which is open at the end, and the shoulder 47 caused by the adjusting movement produces a lengthening of the bypass groove.

The invention is not limited to vibration dampers, but can also be used for other piston-cylinder units, e.g., air springs, to enable a reciprocating movement of the piston rod without blockage in that the bypass groove allows flow around the piston and the two work spaces 17; 19 are connected with one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A piston-cylinder unit, comprising;
   a cylinder comprising first and second cylinder portions, said first cylinder portion being coaxially received inside said second cylinder portion and connected thereto by a threaded connection which is coaxial with said first and second cylinder portions; and
   a piston axially displaceable in said cylinder, said piston separating said cylinder into two work chambers, said cylinder having a bypass groove in said first cylinder portion for communicating between said two work chambers depending on a stroke position of said piston relative to said first cylinder portion, said bypass groove extending in a direction parallel to the axis of said cylinder and not extending radially completely through said first cylinder portion, whereby said first cylinder portion is displaceable axially relative to said second cylinder portion and said stroke position where said chambers communicate is adjustable by rotating said first cylinder portion relative to said second cylinder portion.

2. A piston-cylinder unit according to claim 1, further comprising a piston rod attached to said piston, wherein said second cylinder portion includes a base, and said first cylinder portion carries a guide for guiding said piston rod attached to said piston.

3. A piston-cylinder unit according to claim 1, further comprising a retaining screw for clamping said first cylinder portion with respect to said second cylinder portion.

4. A piston-cylinder unit according to claim 1, wherein said first cylinder portion and said second cylinder portion have at least one axial overlap, and at least one seal arranged in said at least one axial overlap.

5. A piston-cylinder unit according to claim 3, wherein said second cylinder portion has an adjusting length region carrying a fastening thread, said retaining screw engaging on said fastening thread.

6. A piston-cylinder unit according to claim 1, further comprising an axially moveable separating piston arranged inside said second cylinder portion for separating one of said two work chambers from a cylinder compensation space.

7. A piston-cylinder unit according to claim 1 further comprising an insert coaxially received in said second cylinder portion and cooperating with said first cylinder portion to form one of said working chambers, said first cylinder portion having an end facing said insert and spaced from said insert, said groove terminating at said end.

8. A piston-cylinder unit as in claim 7 wherein said piston is moveable from said first cylinder portion into said insert, said insert remaining axially stationary when said first cylinder portion is moved axially relative to said second cylinder portion.

9. A piston-cylinder unit as in claim 8 wherein one of said insert and said first portion is provided with a projection and the other of said insert and said first portion is provided with a cutout in which said projection is received so that said insert can be rotated with said first portion relative to said second portion.

10. A piston-cylinder unit, comprising:

a cylinder comprising first and second cylinder portions, said first cylinder portion being coaxially received inside said second cylinder portion and connected thereto by a threaded connection which is coaxial with said first and second cylinder portions;

a piston axially displaceable in said cylinder, said piston separating said cylinder into two work chambers, said cylinder having a bypass groove in said first cylinder portion for communicating between said two work chambers depending on a stroke position of said piston relative to said first cylinder portion, whereby said first cylinder portion is displaceable axially relative to said second cylinder portion and said stroke position where said chambers communicate is adjustable by rotating said first cylinder portion relative to said second cylinder portion; and an insert coaxially received in said second cylinder portion and cooperating with said first cylinder portion to form one of said working chambers, said first cylinder portion having an axial end facing said insert and spaced from said insert, said groove terminating at said end.

11. A piston-cylinder unit as in claim 10 wherein said piston is movable from said first cylinder portion into said insert, said insert remaining axially stationary when said first cylinder portion is moved axially relative to said second cylinder portion.

12. A piston-cylinder unit as in claim 11 wherein one of said insert and said first cylinder portion is provided with a projection and the other of said insert and said cylinder first portion is provided with a cutout in which said projection is received so that said insert can rotate with said first cylinder portion relative to said second cylinder portion.

13. A piston-cylinder unit according to claim 10 further comprising a piston rod attached to said piston, wherein said second cylinder portion includes a base, and said first cylinder portion carries a guide for guiding said piston rod attached to said piston.

14. A piston-cylinder unit according to claim 10 further comprising a retaining screw for clamping said first cylinder portion with respect to said second cylinder portion.

15. A piston-cylinder unit according to claim 10 wherein said first cylinder portion and said second cylinder portion have at least one axial overlap, and at least one seal arranged in said at least one axial overlap.

16. A piston-cylinder unit according to claim 15 wherein said second cylinder portion has an adjusting length region carrying a fastening thread, said retaining screw engaging on said fastening thread.

17. A piston-cylinder unit according to claim 10 wherein said bypass groove extends in a direction parallel to the axis of said cylinder.

* * * * *

UNITED STATES PATENT AND TRADEMARK OFFICE
CERTIFICATE OF CORRECTION

PATENT NO. : 6,588,555 B2
DATED : July 8, 2003
INVENTOR(S) : Theo Rottenberger

It is certified that error appears in the above-identified patent and that said Letters Patent is hereby corrected as shown below:

<u>Title page,</u>
Item [75], Inventors, should read -- Hubert Strobl, Gilching (DE) --

Signed and Sealed this

Twenty-first Day of October, 2003

JAMES E. ROGAN
*Director of the United States Patent and Trademark Office*